United States Patent
Sao et al.

(10) Patent No.: US 8,276,820 B2
(45) Date of Patent: Oct. 2, 2012

(54) INFORMATION NOTIFICATION METHOD AND INFORMATION NOTIFICATION SYSTEM

(75) Inventors: Masataka Sao, Kawasaki (JP); Tsuyoshi Takeuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 178 days.

(21) Appl. No.: 12/719,174

(22) Filed: Mar. 8, 2010

(65) Prior Publication Data

US 2010/0225653 A1 Sep. 9, 2010

(30) Foreign Application Priority Data

Mar. 9, 2009 (JP) .................................. 2009-55288

(51) Int. Cl.
G06K 7/10 (2006.01)
G06K 9/18 (2006.01)
(52) U.S. Cl. ................. 235/462.09; 235/462.1; 235/375
(58) Field of Classification Search ............ 235/462.09, 235/462.1, 462.01, 454, 494, 375
See application file for complete search history.

(56) References Cited

U.S. PATENT DOCUMENTS

| | | | | |
|---|---|---|---|---|
| 6,144,848 | A | * | 11/2000 | Walsh et al. ................. 455/419 |
| 2003/0198383 | A1 | * | 10/2003 | Yamaguchi et al. .......... 382/183 |
| 2008/0011827 | A1 | * | 1/2008 | Little et al. .................... 235/380 |
| 2008/0142599 | A1 | * | 6/2008 | Benillouche et al. .... 235/462.41 |

FOREIGN PATENT DOCUMENTS

| | | |
|---|---|---|
| JP | 2004-208256 | 7/2004 |
| JP | 2005-346577 | 12/2005 |
| JP | 2006-178601 | 7/2006 |

* cited by examiner

*Primary Examiner* — Edwyn Labaze
(74) *Attorney, Agent, or Firm* — Staas & Halsey LLP

(57) ABSTRACT

An information notification method includes coding information by a first information processing apparatus, displaying the coded information on a screen of the first information processing apparatus, obtaining displayed coded information as image information by a second information processing apparatus having an image-capturing unit, transmitting the obtained image information to a third information processing apparatus from the second information processing apparatus, receiving at the third information processing apparatus the image information transmitted from the second information processing apparatus, and decoding by the third information processing apparatus the received image information so as to obtain the coded information.

12 Claims, 14 Drawing Sheets

INFORMATION NOTIFICATION METHOD AND INFORMATION NOTIFICATION SYSTEM

CROSS-REFERENCE TO RELATED APPLICATIONS

This application is based upon and claims the benefit of priority of the prior Japanese Patent Application No. 2009-55288, filed on Mar. 9, 2009, the entire contents of which are incorporated herein by reference.

FIELD

Embodiments discussed herein relate to an information notification method, an information notification system, an information processing apparatus, and an information notification program.

BACKGROUND

A typical remote computer may have a general function of displaying update information and an information transmission destination address that are formed as an image on a display unit. A mobile phone with an image-capturing function may decode an information transmission destination address from the information transmission destination address that is captured and formed as an image, and transmit the information transmission destination address formed as an image to the information transmission destination address. A central computer has a function of decoding the transmitted image information.

Furthermore, a typical method for obtaining service specific information on a device by a portable terminal substitutes the service specific information communication unit of the device with bar code display, and an I/F unit for obtaining service specific information from the device in the portable terminal with a bar code reader. In addition, other than bar codes, a display that is capable of displaying two-dimensional bar code, such as a QR code, in accordance with the amount of service specific information is set as a service specific information communication unit of the device.

Furthermore, a typical maintenance target device generally has an operation panel for displaying the state inside the device in the form of two-dimensional bar code display. In such device, a mobile phone that has a camera and sends the captured image of two-dimensional bar code can be used, thereby notifying a computer of the state of the maintenance target device.

Technologies related to information notification methods are generally discussed in Japanese Unexamined Patent Application Publication Nos. 2006-178601, 2004-208256, and 2005-346577.

SUMMARY

According to an aspect of the invention, an information notification method includes coding information by a first information processing apparatus, displaying the coded information on a screen of the first information processing apparatus, obtaining displayed coded information as image information by a second information processing apparatus having an image-capturing unit, transmitting the obtained image information to a third information processing apparatus from the second information processing apparatus, receiving at the third information processing apparatus the image information transmitted from the second information processing apparatus, and decoding by the third information processing apparatus the received image information so as to obtain the coded information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed. Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DESCRIPTION OF EMBODIMENTS

Figure 1:
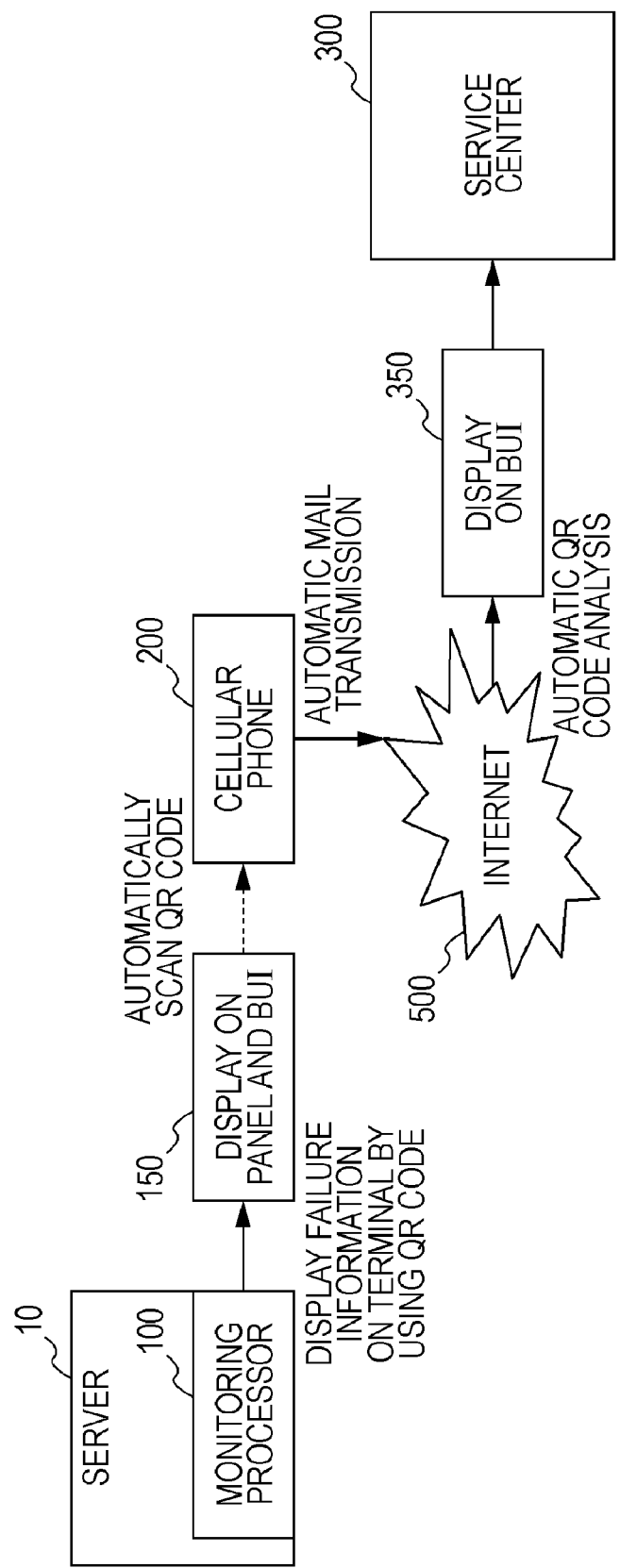
FIG. 1 is a block diagram of an information notification system according to an embodiment of the invention.

Reference will now be made in detail to the embodiments, examples of which are illustrated in the accompanying drawings, wherein like reference numerals refer to the like elements throughout. The embodiments are described below to explain the present invention by referring to the figures.

To achieve qualitative improvements in services and reduce costs of services provided by a server serving to provide various services, it is desired that notification of failure information be provided quickly and accurately to a service center when a failure occurs in the server. For example, in an environment in which a server provides services related to bank business, it is required that failure information be notified using a dedicated line without the intervention of a public network from the point of view of security.

Prior to the detailed description of an embodiment, a reference example will be described.

In the above-described environment, the notification of failure information from a monitoring processor incorporated in the server to the service center is performed by the following method.

When the server is connected with a network, the failure information detected by the monitoring processor is notified to the service center via the network.

On the other hand, in a case where the server is not connected with a network, it is not possible to notify the failure information detected by the monitoring processor to the service center via the network. In this case, the failure information detected by the monitoring processor is displayed on a management terminal, and a server manager confirms the content of the displayed failure information, and notifies the service center by using communication device such as a telephone. Alternatively, the server manager copies the failure information displayed on the management terminal manually, and notifies it to the service center by using electronic mail for example.

In the reference example, the following problems are considered.

In a case where a server cannot be connected to a network due to a security reason, such as the server is used in the banking business, a series of operations to perform notification from the monitoring processor to the service center is performed by the server manager manually. In this case, the failure information detected by the monitoring processor is displayed on the management terminal, and the server manager notifies the service center of the information displayed on the management terminal by using a telephone or by manual operations. Thus, information leakage and/or malfunctions can occur.

In an embodiment, a system that notifies failure information of an information processing apparatus that is not connected to a network to an information processing apparatus of a notification destination is provided.

FIG. 1 illustrates an embodiment of the invention.

In FIG. 1, a server 10 is not connected to a network. In FIG. 1, the monitoring processor 100 generates a QR code based on information including the detected failure information when a monitoring processor 100 inside the server 10 detects failure information regarding the server 10. The monitoring processor 100 displays the generated QR code on a screen of a management terminal 150 of the server 10, which has a browser user interface (BUI), a panel, and the like. The QR code displayed on the screen of the management terminal 150 is captured by a cellular phone 200 provided with a built-in camera (hereinafter referred to as a "cellular phone"). The cellular phone 200 is disposed in such a manner that the built-in camera faces the screen of the management terminal 150. The cellular phone 200 transmits the image of the QR code captured by the built-in camera to a server provided in a service center (hereinafter such server referred to as a "service center") by using the electronic mail transmission function of the cellular phone 200. While generation of a QR code is used as an example, the present invention is not limited to any particular type of code using which the detection information is presented.

A management terminal 350 provided in a service center 300 receives the image of the QR code transmitted from the cellular phone 200. The service center 300 receives, from the management terminal 350, the image on the QR code received from the cellular phone 200, and analyzes and decodes the QR code, thereby obtaining the failure information detected by the monitoring processor 100. The service center 300 displays the obtained failure information on the screen of the management terminal 350.

The manager of the service center 300 recognizes the failure information displayed on the management terminal 350 and prepares, for example, replacement parts necessary to deal with the failure of the server 10, which is the transmission source of the failure information. In the service center 300, the QR code is decoded by using a QR code decoding program, and failure information coded into a QR code is obtained.

According to the embodiment, it is possible to perform a series of operations necessary to notify the service center 300 of failure information from the server 10 even in an environment in which the server 10 cannot be connected to the network because of security reason for example. As a result, in the present embodiment, it is possible to prevent leakage of failure information which the service center 300 is to be notified of, or an occurrence of mistakes during operations of notification of failure information, and the like, which can occur as a result of manual operations of the server manager. Therefore, according to the present embodiment, it is possible to notify the service center 300 of the failure information of the server 10 without requiring the server manager to perform manual operations.

According to the present embodiment, it is possible for the server manager to eliminate operations, such as copying the content of the failure information by manual operations, and can transmit the failure information in more quicker and more accurate way. Furthermore, according to the present embodiment, even in a case where a network cannot be used due to the problem of security in business, in particular, it is possible to automatically perform a series of operations for notification of failure information without human intervention.

Figure 2:
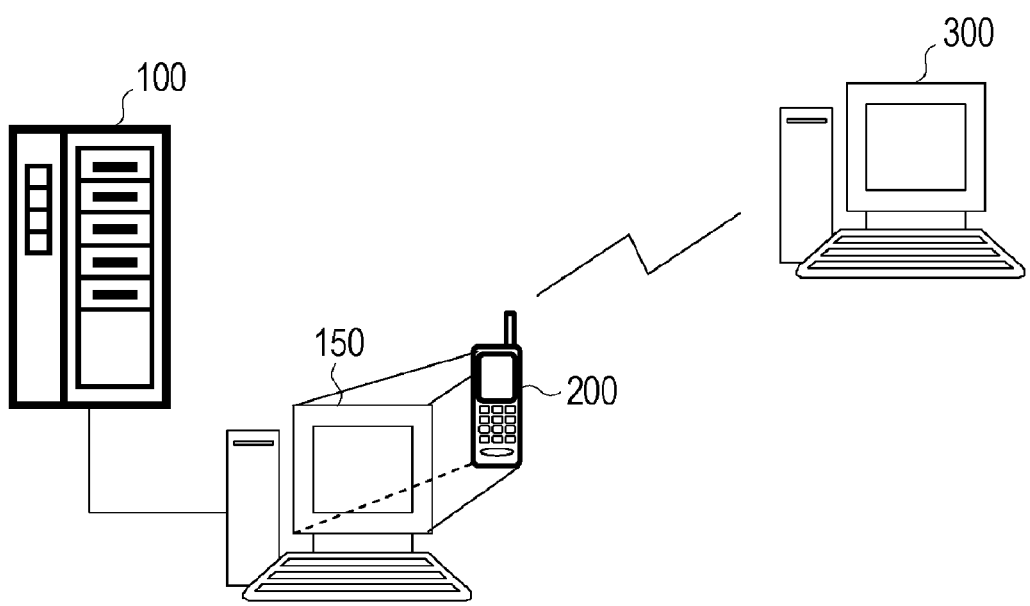
FIG. 2 illustrates a hardware configuration of an information notification system according to an embodiment.

As described above, according to the present embodiment, as illustrated in FIG. 1, information indicating the failure detected by the monitoring processor 100 inside the server 10 is transmitted to the service center 300 via a network 500. In the present embodiment, the failure information is coded into a QR code, and the QR code is displayed on the screen of the management terminal 150 in the form of a panel, a BUI, or the like. Then, the cellular phone 200 disposed so as the built-in camera directly faces the screen of the management terminal 150 captures the QR code displayed on the screen of the management terminal 150. Then, the image of the QR code captured by using the built-in camera of the cellular phone 200 is transmitted from the cellular phone 200 to the service center 300 by an electric mail, for example as shown in FIG. 2. As a result, even in an environment where information transmission via the network is not possible due to the security reason, it is possible to perform a series of operations related to the notification of the failure information. In the present embodiment, as a result of a series of operations related to the notification of the failure information being automated, the possibility of information leakage, occurrence of errors, and the like can be eliminated.

Figure 3:
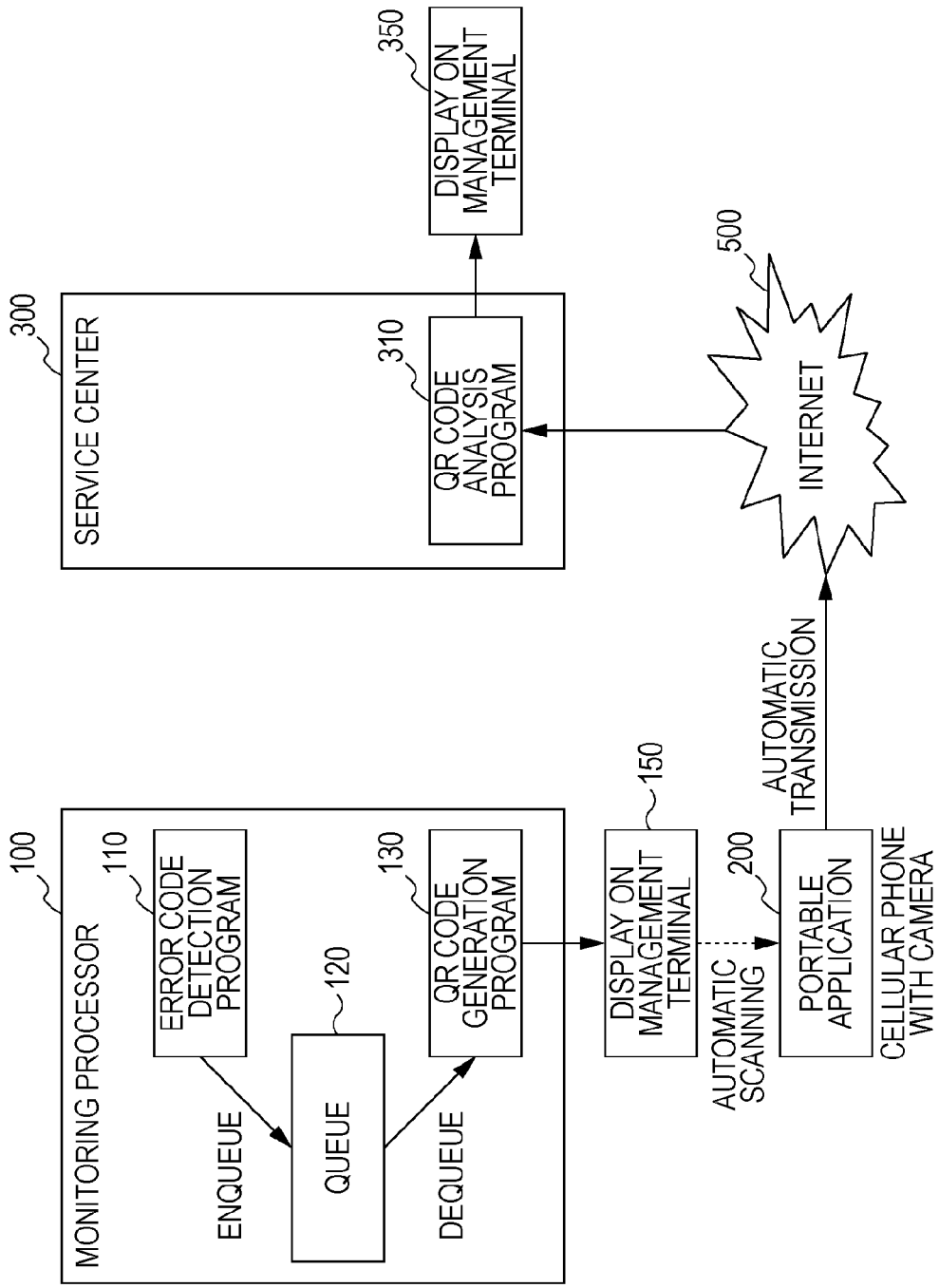
FIG. 3 illustrates function(s) of hardware of the information notification system according to an embodiment.

FIG. 3 illustrates a hardware configuration of an information notification system according to an embodiment. The information notification system illustrated in FIG. 3 includes a monitoring processor 100 inside the server 10, the management terminal 150 on the server 10 side, the cellular phone 200, the service center 300, and the management terminal 350 on the service center side. The service center 300 has a QR code decoding program 310.

The monitoring processor 100 includes an error code detection program 110, a queue 120, in fact a memory device, and a QR code generation program 130. When the monitoring processor 100 detects failure occurred within the server 10, the monitoring processor 100 stores an error code corresponding to the detected failure in the queue 120 each time the failure is detected. The monitoring processor 100 periodically extracts the error code stored in the queue 120, and generates a QR code based on the extracted error code. Since the size of the QR code is limited, in FIG. 2, it is assumed that the size of an error code to be extracted to generate one QR code is limited to be 4 kB or less. While an exemplary limit size is discussed herein, the present invention is not limited to a particular code and as such threshold size may vary.

When generating a QR code, the monitoring processor 100 sequentially extracts the error codes in an order of the occurrence of the failure from the queue 120, and uses the error codes so as to generate a QR code. The monitoring processor 100 displays the generated QR code on the screen of the management terminal 150. Furthermore, the monitoring processor 100 periodically updates the QR code displayed on the screen of the management terminal 150.

The QR code displayed on the screen of the management terminal 150 is periodically captured by the built-in camera of the cellular phone 200, and is transmitted to the service center 300 via the communication network 500 through electronic mail or the like. The timing of the image capturing of the cellular phone 200 and the timing of the updating of the QR code displayed on the screen of the management terminal 150 is controlled including to be synchronized.

When the service center 300 receives a QR code from the cellular phone 200 via the communication network 500, the QR code is analyzed by the QR code analysis program 310 and is decoded, and failure information that is coded into a QR code is obtained. Then, the service center 300 displays the obtained failure information on the management terminal 350.

Figure 4:
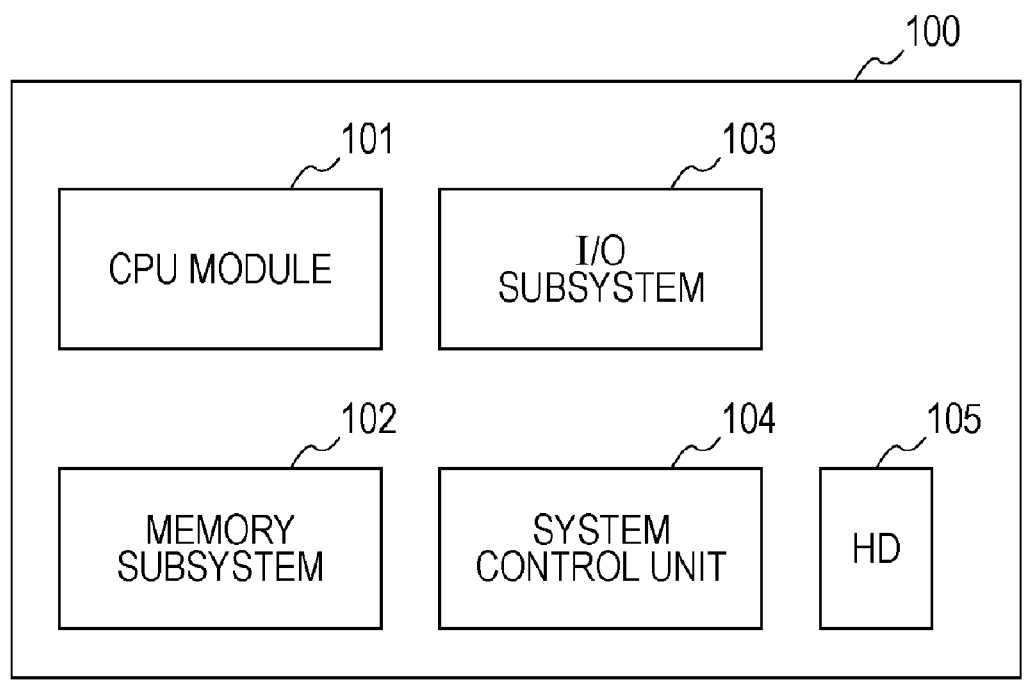
FIG. 4 illustrates an example of a configuration of the hardware of a monitoring processor illustrated in FIG. 3.

FIG. 4 illustrates an example of a hardware configuration of the monitoring processor 100.

The monitoring processor 100 includes a CPU module 101, an I/O subsystem 103, a memory subsystem 102, a system control unit 104, and a hard disk (HD) device 105. The CPU module 101 provides data processing including a computation function. The I/O subsystem 103 provides an interface function of exchanging information with external device(s). The system control unit 104 provides a function of managing including operations of the entire monitoring processor 100. The memory subsystem 102 and the hard disk device 105 store various kinds of programs and data, and also provides a work area for the CPU module 101. Examples of programs to be stored in the memory subsystem 102 and the hard disk device 105 include the error code detection program 110 and the QR code generation program 130 as illustrated in FIG. 3. The programs 110 and 130 are installed into the monitoring processor 100. By executing these programs by the CPU module 101, the functions as the monitoring processor 100 are realized.

Figure 5A:
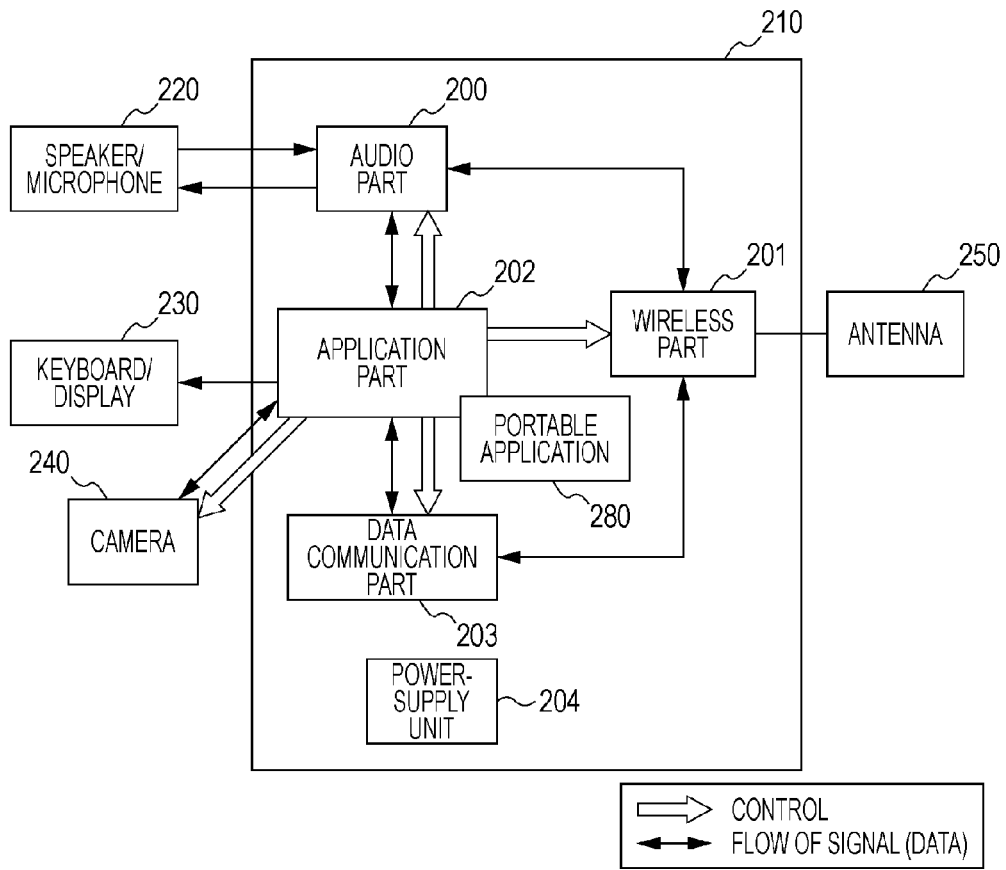
FIGS. 5A and 5B illustrate examples of the hardware configuration and the software configuration of a cellular phone illustrated in FIG. 3.
Figure 5B:
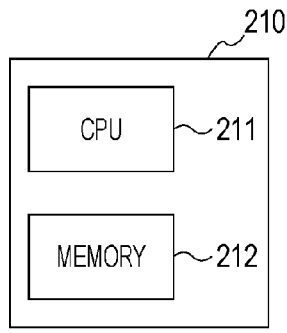

FIGS. 5A and 5B show a hardware and a software configuration of the cellular phone 200.

As shown in FIG. 5A, the cellular phone 200 includes, as hardware, a main board 210 on which various kinds of electronic circuits are mounted, a battery (power supply) 204, a screen display device (display) 230, a camera 240, a keyboard 230, a microphone 220, and a speaker 220. The battery 204 supplies electric power to each component inside the cellular phone 200. While specific components are shown as part of the cellular phone, the present invention is not limited to any particular type or number of components.

As illustrated in FIG. 5B, the main board 210 has a CPU 211 and a memory 212 mounted thereon. The CPU 212 provides a computation function. Programs and/or data are stored in the memory 212, and the memory 212 is also used as a work area for the CPU 212.

Furthermore, as illustrated in FIG. 5A, the cellular phone 200 has a wireless unit 201 that implements a wireless communication function, an application unit 202 that implements various functions of display, operation, electronic mail, dialing, and the like, and a data communication unit 203 that controls audio communication and data communication. These units can be implemented as software. An application program (hereinafter referred to as a "portable application") 280 as the application unit 202 is installed into the cellular phone 200. By executing the portable application by the CPU 211, each of the functions of the cellular phone 200 is controlled. The portable application 280 is stored in the memory 212.

Figure 6:
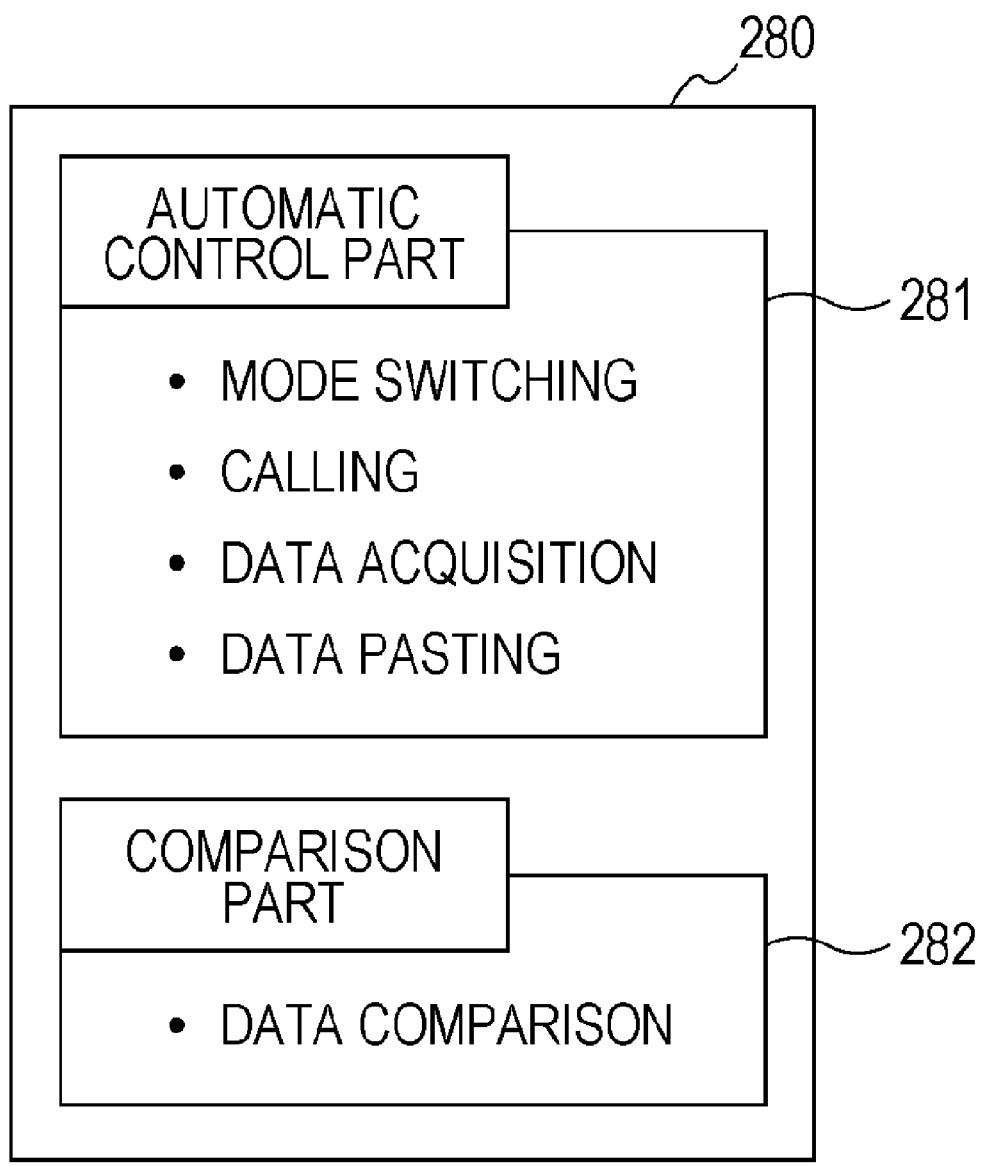
FIG. 6 illustrates a structure of a portable application illustrated in FIG. 5.

FIG. 6 illustrates an example of a configuration of the portable application 280.

The portable application 280 includes control part 281 and a comparison part 282. The control part 281 controls various functions possessed by the cellular phone 200, including the functions of the wireless part 201 and the data communication unit 203. Furthermore, the control part 281 performs control of switching of the modes possessed by the cellular phone 200, calling of each function, obtaining of data, operation of pasting data in electronic mail, and the like.

The comparison part 282 determines whether the QR code has successfully read or not, which is displayed on the screen of the management terminal 150 of the server 10, and whether the QR code is a code in which information indicating an abnormality of a system is recorded, and the transmission of the QR code has succeeded or failed. Furthermore, the comparison part 282 determines a timing of calling various kinds of operations, such as transmission of electronic mail and switching of modes.

Figure 7:
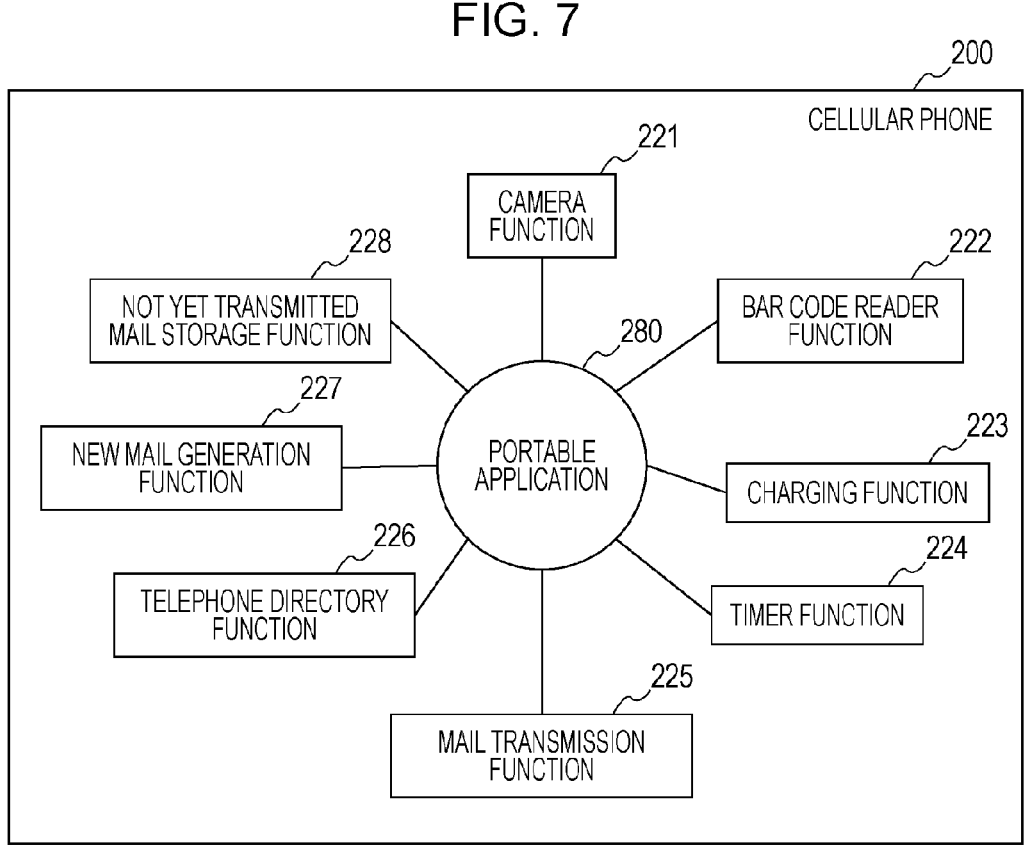
FIG. 7 illustrates function(s) of the cellular phone illustrated in FIG. 3.

FIG. 7 illustrates various functions possessed by the cellular phone 200.

As illustrated in FIG. 7, the cellular phone 200 includes a camera function 221, a bar code reader function 222, a charging function 223, a timer function 224, an electronic mail transmission function 225, a telephone directory function 226, an electronic mail generation function 227 to generate new electric mails, and a storage function 228 to store electric mails that are not transmitted yet (such function referred to as "not yet transmitted electronic mail storage function"). These various functions are controlled by the portable application 280.

The constituent portions provided in a cellular phone which has been currently put in the market can be used as for the constituent portions that realize the various functions 221 to 228 illustrated in FIG. 7. The portable application 280 provides the functions of calling and operation checking of the various functions 221 to 228. The control part 281 of the portable application 280 enables the calling of the camera function 221, the bar code reader function 222, the timer function 223, the electronic mail transmission function 224, the telephone directory function 225, the new electronic mail generation function 226, and the not yet transmitted electronic mail storage function 227.

Since the addresses of the server manager and the service center 300 become necessary when notification is made to the server manager and the service center 300, the addresses of the server manager and the service center 300 are registered in advance in the telephone directory function 226. Furthermore, the database for storing QR codes do not indicating failure of the server are registered by using the storage function of the telephone directory function 226, a memory card (not illustrated), the telephone directory function 226, the not yet transmitted electronic mail storage function 228, and the like.

Figure 8:
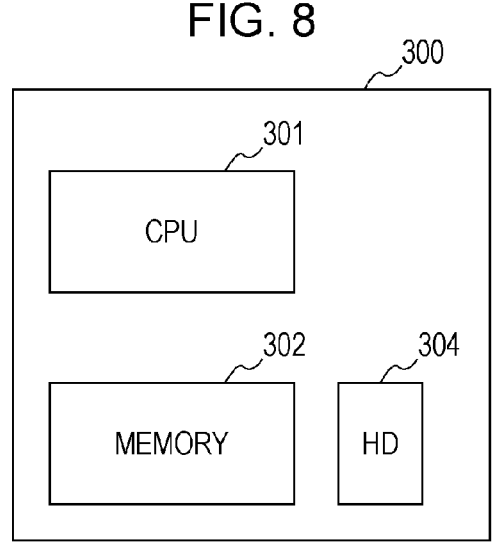
FIG. 8 illustrates an example of a configuration of the hardware of a service center illustrated in FIG. 3.

FIG. 8 illustrates an example of a hardware configuration of the service center 300.

As illustrated in FIG. 8, the service center 300 can be a personal computer as an example. The personal computer used as the service center 300 includes a CPU 301, a memory 302, and a hard disk device 304.

The CPU 301 provides a computation function. The memory 302 and the hard disk device 304 store programs and data and also provides a work area for the CPU 301. The QR code analysis program 310 is installed into a personal computer used as the service center 300. By executing the QR code analysis program 310 by the CPU 301, the functions as the service center 300 are realized.

Information which is a basis for the QR code generated by the monitoring processor 100 will be described with reference to FIG. 9.

The information which is a basis for the QR code includes information indicating failed parts of the server, positions of the failed parts, error code indicating a kind of occurred failure or the like, and the address indicating the place where the failure occurred. Furthermore, as the information which is a basis for the QR code, information for a normal system (FIG. 9A) and information for an abnormal system (FIG. 9B) are provided. The information for a normal system is information generated in a case where the monitoring processor 100 has not detected the failure of the server 10. On the other hand, the information for an abnormal system is information generated in a case where the monitoring processor 100 has detected a failure of the server 10.

A case which the cellular phone 200 fails to read the QR code displayed on the screen of the management terminal 150 can be assumed. In order to make it possible to detect that the cellular phone 200 has failed to read the QR code, the information for a normal system is provided separately from the information for an abnormal system in the present embodiment. As an example of case where the cellular phone failed to read a QR code may include, a case where the cellular phone 200 moves from a position where the cellular phone is disposed due to the influence of an earthquake or the like, and the state in which the built-in camera of the cellular phone 200 faces the screen of the management terminal 150 to capture the displayed QR code is distorted.

Figure 9A:
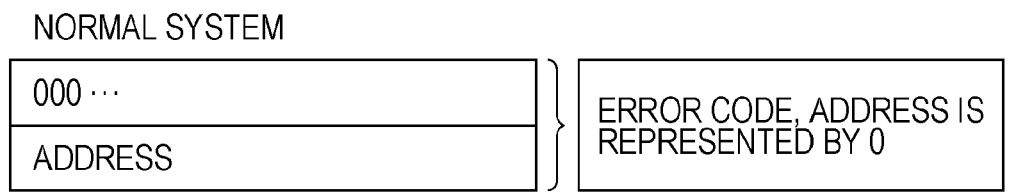
FIGS. 9A and 9B illustrate QR codes according to an embodiment.

The information which is a basis for the QR code of a normal system illustrated in FIG. 9A does not particularly include failure information. For this reason, "error code" is set to "000 . . . " (all "0"), and "0" is set to "address".

Figure 9B:
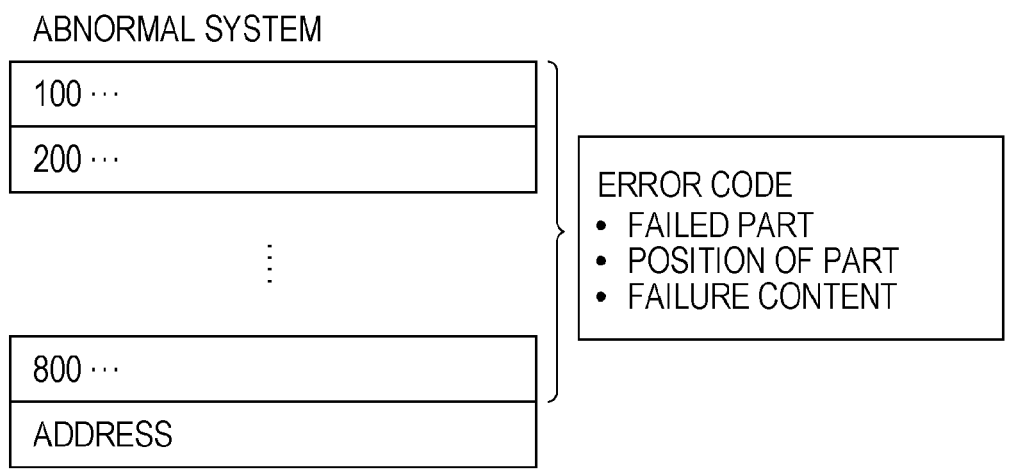

On the other hand, the information for an abnormal system illustrated in FIG. 9B includes "error code" and "address".

The "error code" corresponds to failure information and indicates the information corresponding to the part of the server in which a failure has occurred, the position of the part, failure content, and the like.

As illustrated in FIG. 9B, information such as the information on the failed parts, the positions of the parts, and the failure content are coded like "100 . . . ", "200 . . . ", . . . , "800 . . . ", and these information are set as error codes. Because of a characteristic of the QR codes, the size of the information to be coded to the QR code is limited to 4 kB or less in the present embodiment. If the amount of information of the "error code" to be coded into the QR code exceeds information 4 kB, "error codes" to be coded are selected in sequence in the order of their occurrence, selected from older code in other way, and a QR code is generated by using the selected "error code" of 4 kB or less.

Figure 10:
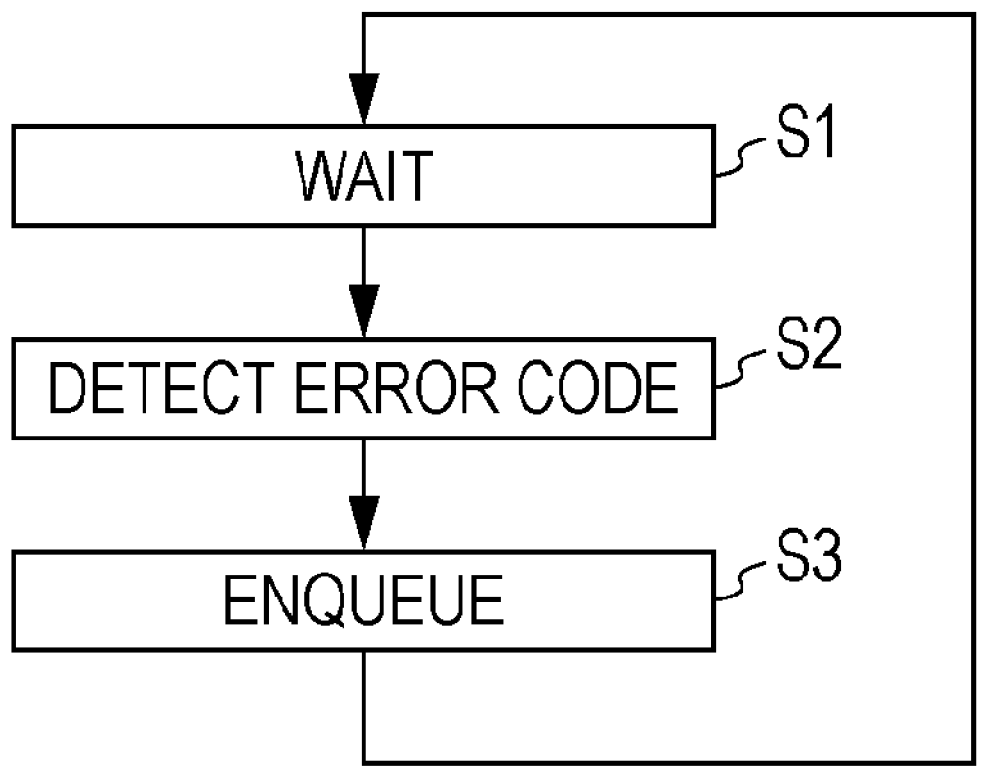
FIG. 10 is a flowchart illustrating operation(s) by an error code detection program of the monitoring processor illustrated in FIG. 3.

FIG. 10 is a flowchart illustrating operations of the error code detection program 110 possessed by the monitoring processor 100.

In FIG. 10, the CPU module 101 of the monitoring processor 100 performs the following operations by executing the error code detection program 110.

Normally, the CPU module 101 is in a waiting state (S1). When the CPU module 101 detects a failure inside the server 10 (S2), the CPU module 101 generates an error code based on failure information related to the detected failure each time the failure is detected, and stores the generated error code in the queue 120 (S3). Operation of storing the error code in the queue 120 is performed for each item of the occurred failure, that is, for each event. When the storage operation (S3) is completed, or when the failure information has not been detected, the CPU module 101 returns to the waiting state again (S1).

When a failure is detected once more (S2), the CPU module 101 stores the error code corresponding to the detected failure in the queue 120 again (S3).

Figure 11:
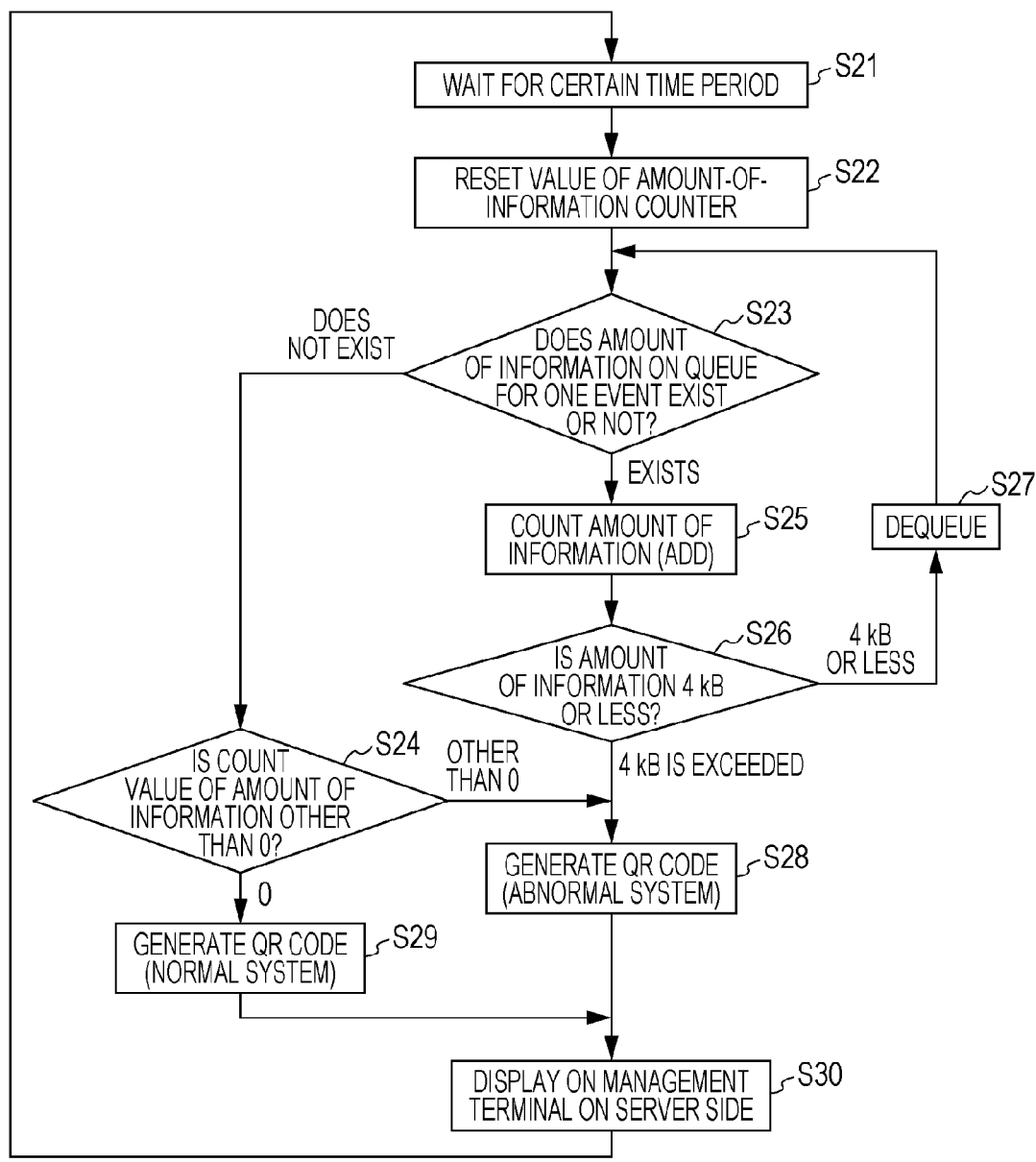
FIG. 11 is a flowchart illustrating operations by a QR code generation program of the monitoring processor illustrated in FIG. 3.

FIG. 11 is a flowchart illustrating operations of the QR code generation program 130 possessed by the monitoring processor 100.

In FIG. 11, the CPU module 101 of the monitoring processor 100 performs the following operations by executing the QR code generation program 130.

The CPU module 101 periodically checks the amount of information stored in the queue 120 for one event. More specifically, after the CPU module 101 waits for a certain time period (S21), the CPU module 101 resets a value of an information counter for counting an amount of the information stored in the queue 120 to zero (S22), and determines whether or not information for one event exists in the queue 120 corresponds to an amount of information for one event (S23). When the determination result shows that the information for one event exists in the queue 120 ("exists" in S23), the CPU module 101 counts the amount of information for one event stored in the queue 120 by using the information counter (S25). In this case, the amount of information for one event is added to the counted value of the information counter.

When the result of the counting in S25 indicates that the count value of the information counter is 4 kB or less ("4 kB or less" in S26), the CPU module 101 extracts an error code for one event from the queue 120 (S27). The CPU module 101 stores the extracted error code as "information for generating a QR code" in a predetermined memory area of the memory subsystem 102. The CPU module 101 repeats the operation of the loop of S23, S25, S26, and S27 until the count value of the information counter exceeds 4 kB. Furthermore, the CPU module 101 performs the extraction of the error code from the queue 120 in the order of occurrence of the events.

When the result of the determination in S26 indicates that the count value of the information counter exceeds 4 kB ("4 kB is exceeded" in S26), the CPU module 101 does not extract the error code for the one event from the queue 120 and causes the process to proceed to S28. In S28, the CPU module 101 generates a QR code (abnormal system) (S28). The generation of the QR code is performed based on the error codes that are stored in sequence in a predetermined memory area of the memory subsystem 102 as "information for generating a QR code" as the result of the operation of the loop of S23, S25, S26, and S27.

On the other hand, when the result of the determination in S23 indicates that an error code for one event does not exist in the queue 120, the CPU module 101 causes the process to proceed to S24. There are following two examples for a case in which an error code for one event does not exist in the queue 120.

A first example is that S23 is performed first after undergoing S21 and S22. In this case, any error code may not exist in the queue 120.

A second example is that S23 is performed after the operation of the loop of S23, S25, S26, and S27 is performed one or more times. In this case, error code may be dequeued from the queue 120.

In S24, the CPU module 101 determines whether or not the count value of the information counter is zero by referring to the information counter. When the count value of the information counter is not zero, the CPU module 101 causes the process to proceed to S28, to generate a QR code (abnormal system). In this case corresponds to the above-mentioned second example, and the queue 120 becomes empty before the counted amount of the information counter exceeds 4 kB in S26.

On the other hand, when the result in S24 indicates that the count value of the information counter is zero, the CPU module 101 generates a QR code (normal system) in S29 (see FIG. 9A). At this time, no error codes exist in the queue 120 in the operation of FIG. 11, and this corresponds to the above-mentioned first example. This means that, no new failure is generated in the server 10 after the operation of FIG. 11 which was performed before performing S24. Therefore, a QR code for a normal system is generated in S29.

When the QR code is generated in S28 or S29, the CPU module 101 displays the generated QR code on the screen of the management terminal 150. Thereafter, each time a certain time period is passed (S21), the CPU module 101 checks the queue 120 again, and resets the count value of the information counter to zero (S22). Thereafter, the CPU module 101 performs the operation of S23 and subsequent operations.

When the count value of the information counter exceeds 4 kB in S26, an error code still remains in the queue 120. The error code remaining in the queue 120 is used to generate a QR code in the next operation of FIG. 11 as described with reference to FIGS. 12A, 12B and 12C.

Figure 12:
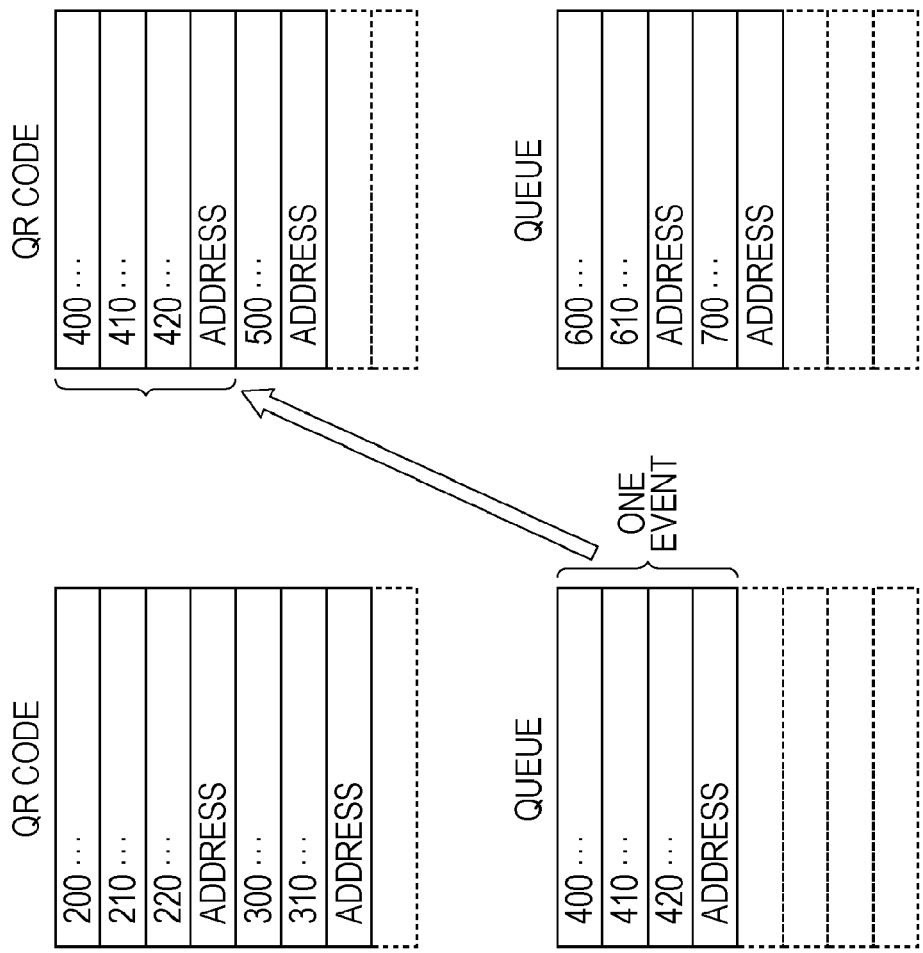
FIGS. 12A, 12B and 12C illustrate an example of generating QR codes in operations by the QR code generation program illustrated in FIG. 3.

FIG. 12 illustrates an example generating QR codes in operations by the QR code generation program of the monitoring processor illustrated in FIG. 3. FIG. 12A illustrates a case in which the amount of information of the error code for generating a QR code does not exceed 4 kB. FIG. 12A corresponds to the second example described in FIG. 11, in which a QR code is generated by the operations of S23, S24, and S28. In this case, all the error codes stored in the queue 120 in the process of FIG. 11 are extracted, and QR codes are generated based on all the extracted error codes. The example FIG. 12A illustrates an example in which QR codes are generated from an error code ("100 . . . " to "160 . . . ") for one event. The error code is extracted for each event and coded into a QR code. Consequently, there is a case in which the error code is coded into a QR code in a state in which the amount of information of the error code does not reach 4 kB. That is, in a case where the error code for one oldest event does not reach 4 kB, but the error code exceeds 4 kB if the error code corresponds to the next old one event is added, a QR code is generated in a state where the error code does not reach 4 kB.

FIG. 12B illustrates a case in which the amount of information of the error code for generating a QR code exceeds 4 kB. In FIG. 12B, error codes stored in the queue 120 are extracted in the order of their occurrence for each event, and are coded into QR codes within a range that does not exceed 4 kB. In the example of FIG. 12B, when the error codes ("200 . . . " to "220 . . . ") of the oldest event and the error codes ("300 . . . ", "310 . . . ") of the next old event are added, the amount of added error codes is 4 kB or less. However, when the error codes ("400 . . . " to "420 . . . ") of the next old, that is the third old event, is added, the amount of added error codes exceeds 4 kB. In this case, the error code of the third old event is processed during the next operation of FIG. 11.

FIG. 12C illustrates a case where the error code of the third old event is processed. In the case of FIG. 12C, the error codes ("400 . . . " to "420 . . . ") of the event, which have not previously been extracted and remains in the queue 120 is stored in the queue 120 as they are. Furthermore, the error code ("500 . . . "), the error code ("600 . . . " to "610 . . . "), and the error code ("700 . . . ") of the next three events is also stored in the queue 120. That is, in the state of FIG. 12C, a total of four error codes correspond to four events is stored in the queue 120. The sizes of the error codes of the first and second events among the four events stored in the queue 120 are 4 kB or less, and if the error code of the third event is added to these two error codes, the size of the added error codes exceeds 4 kB. Therefore, in this case, the error codes of the first and second events are extracted and coded into a QR code, and the error codes of the third and fourth events are further passed to the next process.

Next, with reference to FIG. 13, the operation of the portable application 280 will be described.

Figure 13:
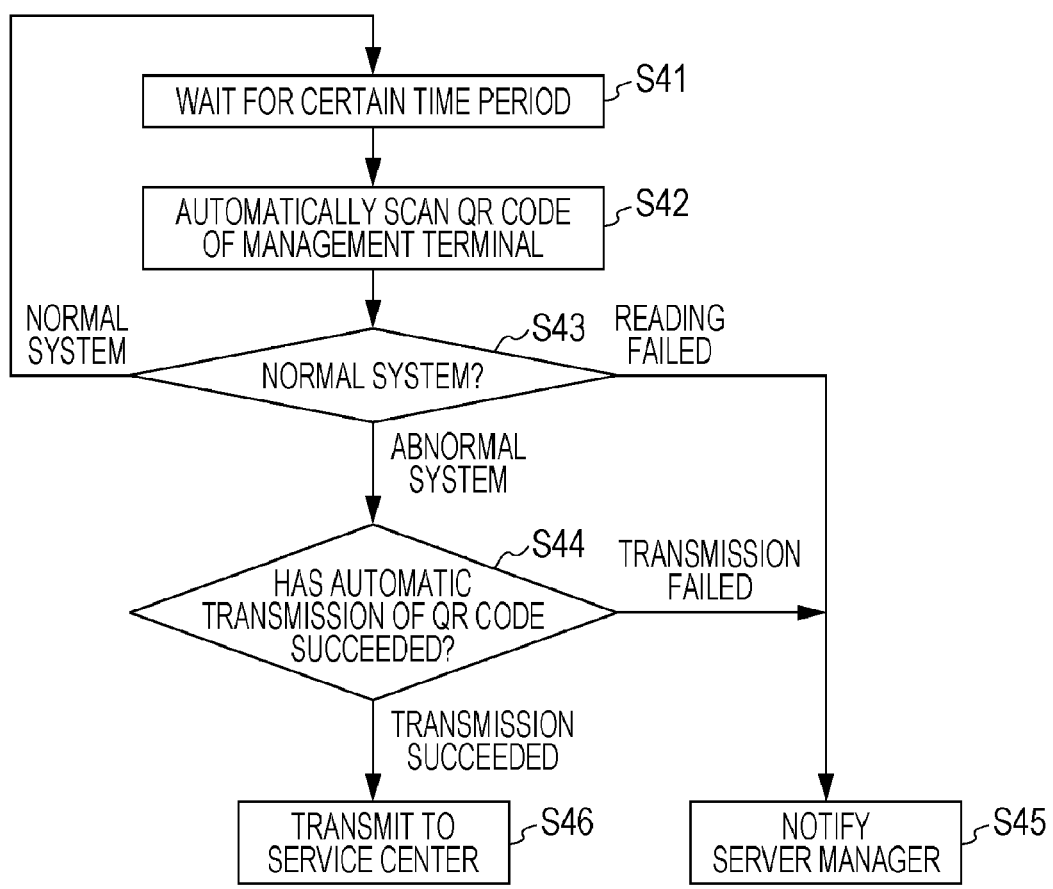
FIG. 13 is a flowchart illustrating operations by the portable application illustrated in FIG. 6.

The operations of FIG. 13 are performed at certain time intervals by executing the portable application 280 by the CPU 211.

In the operations of FIG. 13, in order to read the image of a QR code from the screen of the management terminal 150 and to transmit the read information to the service center 300, the cellular phone 200 is provided. The portable application 280 is installed into the cellular phone 200. The portable application 280 is executed by the CPU 211 of the cellular phone 200, making it possible to transmit the QR code from the cellular phone 200. Furthermore, in order to enable the cellular phone 200 to read the QR code displayed on the screen of the management terminal 150, the cellular phone 200 is fixed at a position at which the screen of the management terminal 150 can be captured with a built-in camera. Furthermore, the management terminal 150 in which the screen is captured by the cellular phone 200 is fixed at a predetermined position in advance. In this disposed state, the cellular phone 200 periodically captures the QR code displayed on the screen of the management terminal 150 by the built-in camera (S41, S42). The image capturing of the QR code is performed by the camera function 221 using a built-in camera, and a time interval for capturing the QR code is determined by the timer function 224. The image capturing of the QR code is performed when the bar code reader function 222 is called by the control part 281 of the portable application 280. The timing at which each of the camera function 221 and the bar code reader function 222 is performed is controlled by the control part 281.

Next, in S43, the CPU 211 determines whether or not the QR code is successfully captured in S42. In the case that the QR code is successfully captured, the CPU 211 determines whether or not the captured QR code is a QR code for a normal system or a QR code for an abnormal system. In a case where the QR code is successfully captured and it is confirmed that the captured QR code is for an abnormal system ("abnormal system" in S43), the CPU 211 transmits the QR code to the service center 300 (S44). To determine whether the QR code is for a normal system or for an abnormal system in S43, the portable application 280 has a database for the normal system QR codes in advance. The database for a normal system has been registered by using the storage function, such as the memory card, the telephone directory function 226, and the not yet transmitted electronic mail storage function 228.

The CPU 211 compares the database for a normal system (FIG. 9A) with the content of the QR code read in S42. When the result of the comparison shows that they are identical, the read QR code is determined to be of a normal system. On the other hand, when the result of the comparison illustrates that they are not the same, the read QR code is determined to be of an abnormal system. The confirmation of whether or not the read QR code is for an abnormal system is performed by calling the database of a normal system, and by comparing the QR code registered in the database of a normal system with the read QR code by the CPU 211 under the control of the comparison part 282 of the portable application 280.

After the comparison of the QR codes, the CPU 211 calls the new electronic mail generation function 227 and pastes the read QR code in the text of the electronic mail. Furthermore, the CPU 211 calls the address of the service center 300 from the telephone directory function 226 and sets the address as the destination of the electronic mail. Next, the CPU 211 calls the electronic mail transmission function 225 and transmits electronic mail (S44, S46).

There is a case in which the transmission of electronic mail fails due to the influence of a radio wave. In this case, the CPU 211 reports the failure to the server manager (S45). In this case, the CPU 211 calls the not yet transmitted electronic mail storage function 228, accesses the address of the server manager from the telephone directory function 226, and sets the address in the destination of the electronic mail whose transmission has failed. Furthermore, the CPU 211 calls the electronic mail transmission function 225 and transmits the electronic mail whose transmission has failed.

On the other hand, when the determination result of S43 indicates a "normal system", the CPU 211 does not transmit the read QR code, waits for a certain time period (S41), and captures the QR code again (S42). In this case, the CPU 211 temporarily completes the bar code reader function 222, and waits until a certain time period is passed by using the timer function 224.

When the result of S43 indicates "reading failed", the CPU 211 reports the reading failure to the server manager (S45). In this case, the CPU 211 causes the control part 281 of the portable application 280 to call the new electronic mail generation function 227, and sets the destination of the server manager in the new electronic mail by using the telephone directory function 226. Then, the CPU 211 uses the electronic mail transmission function 225 so as to transmit the electronic mail.

In the information notification system of the present embodiment, in a case where the cellular phone 200 needs to be operated for 24 hours so as to maintain a state in which the QR code of an abnormal system can be transmitted, an environment in which the cellular phone 200 can be always charged and a radio wave can be always reached is provided.

Figure 14A:
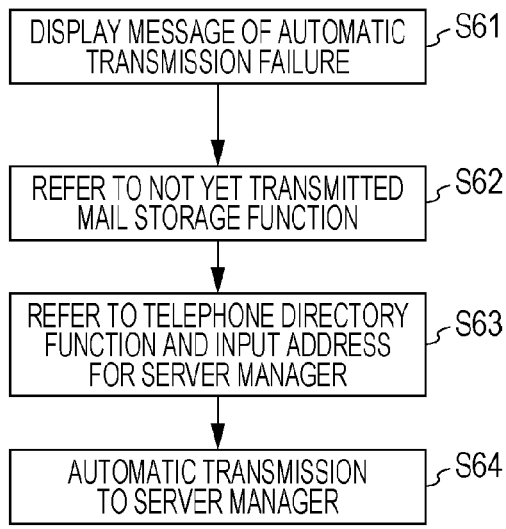
FIG. 14A is a flowchart illustrating operations by the portable application illustrated in FIG. 6.
Figure 14B:
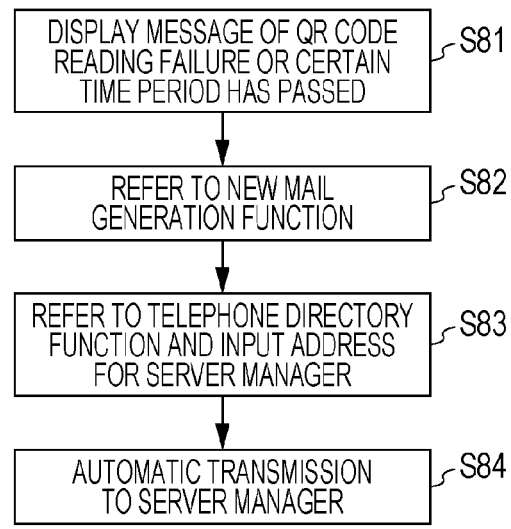
FIG. 14B is a flowchart illustrating operations by the portable application illustrated in FIG. 6.

With reference to FIGS. 14A and 14B, an example of operations for reporting to the server manager in S45 of FIG. 13 will be described below. FIG. 14A illustrates an example of an operation in a case where the transmission of a QR code has failed ("transmission failed" in S44 of FIG. 13). FIG. 14B illustrates an example of an operation in a case where the reading of the QR code has failed ("reading failed" in S43 of FIG. 13). Each of the operations is performed by executing the portable application 280 by the CPU 211.

In a case where the transmission of the QR code has failed in FIG. 14A, the CPU 211 displays a message of "OR code reading failed" on the screen of the cellular phone 200 (S61). After displaying the message or after a certain time period has passed, the control part 281 calls the not yet transmitted electronic mail storage function 228 (S62). The CPU 211 sets the address of the server manager, which was accessed from the telephone directory function 226, in the electronic mail that is stored as not yet transmitted electronic mail (S63), and transmits the electronic mail by using the electronic mail transmission function 225 (S64).

The electronic mail is stored as the not yet transmitted electronic mail by the not yet transmitted electronic mail storage function 228 at the time of "transmission failed" in S44 of FIG. 13. Therefore, the QR code has been pasted to the text of the not yet transmitted electronic mail in S44.

In the case that the reading of the QR code fails in FIG. 14B, the CPU 211 displays the message of "transmission failed" on the screen of the cellular phone 200 (S81). Then, by using the control part 281 of the portable application 280, the new electronic mail generation function 227 is called (S82). The CPU 211 sets the address of the server manager, which was accessed from the telephone directory function 226, in the new electronic mail (S83), and transmits the electronic mail by using the electronic mail transmission function 225 (S84). No information is contained in the main text of the new electronic mail.

The distinction between the case of the reading failure in FIG. 14B and the case in which the electronic mail could not be transmitted in FIG. 14A can be made according to whether or not information has been put in the text of the electronic mail transmitted in S84 and S64. The electronic mail transmitted to the server manager in S64 of FIG. 14A is electronic mail related to "transmission failed" in S44 of FIG. 13 and is electronic mail in which the QR code has already been pasted to the main text in S44.

On the other hand, the electronic mail transmitted to the server manager in S84 of FIG. 14B is electronic mail that has been newly generated by the new electronic mail generation function 227, with no information contained in the main text.

Figure 15:
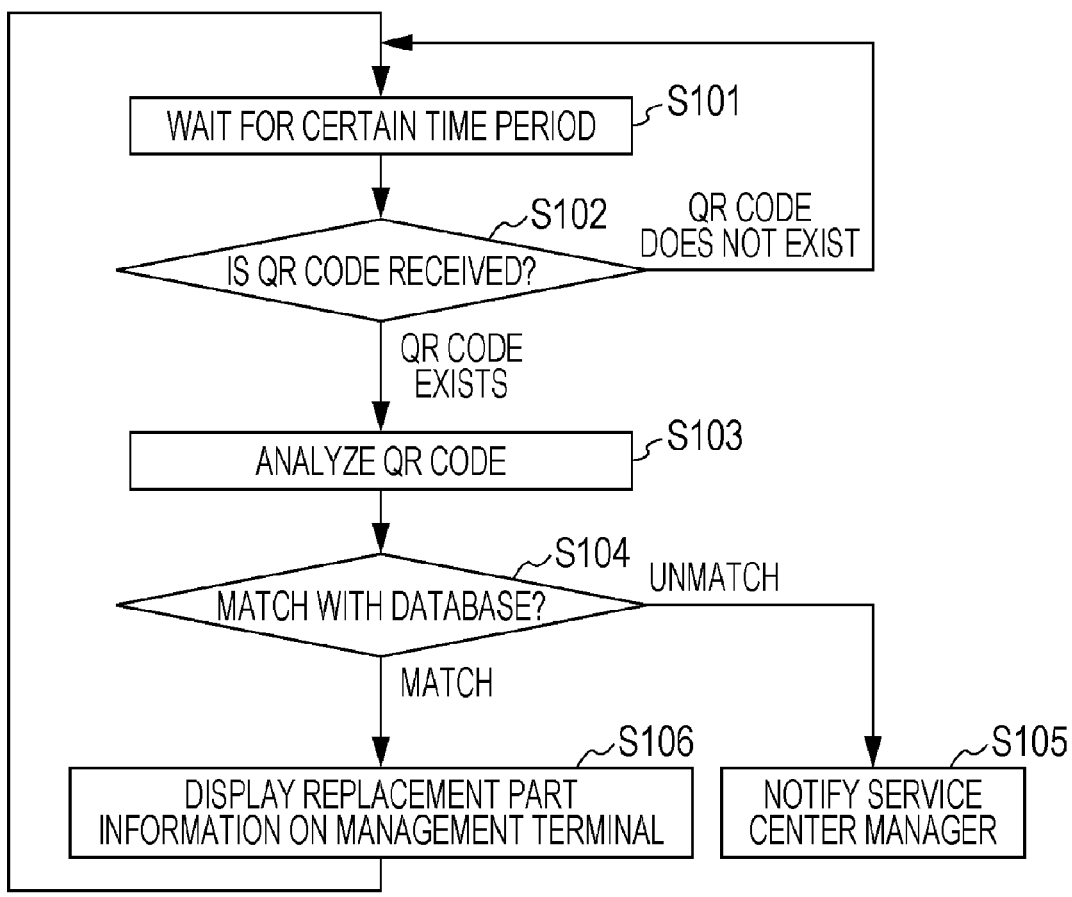
FIG. 15 is a flowchart illustrating operations by a QR code analysis program of the service center illustrated in FIG. 3.

A description will be given below, with reference to FIG. 15, of operations of the QR code analysis program 310 possessed by the service center 300. The QR code analysis program 310 is installed into the service center 300 in advance. Furthermore, the QR code analysis program 310 has, in the form of a database, information on failed parts, the positions of the parts, error codes of failure content and the like, and information on addresses.

By executing the QR code analysis program 310 by the CPU 301, the CPU 301 periodically receives a QR code transmitted from the cellular phone 200 (S101, S102). Upon receiving the QR code, ("OR code exists" in S102), the CPU 301 decodes the received QR code. The CPU 301 compares the analysis result of the QR code with the information in the database of information on error codes and addresses (S104). When the result of the comparison shows that the information contained in the QR code matches the information in the database ("match" in S104), the CPU 301 displays, on the management terminal 350, the information on the replacement part corresponding to a "failed part" contained in the error code (S106).

On the other hand, when the information contained in the QR code does not match the information in the database ("unmatch" in S104), the CPU 301 reports the unmatch to the manager of the service center 300 (S105). Furthermore, when the QR code has not been received ("OR code does not exist" in S102) or when the information display on the management terminal 350 is completed, the CPU 301 waits for a certain time period (S101) until the QR code is received once more in S102.

As has been described above, in the present embodiment, since an information processing apparatus is disposed so that coded information that is displayed on a screen by an information processing apparatus of an information notification source can be obtained as image information, the information processing apparatus can obtain the coded information as image information. Therefore, it is possible to easily and more reliably report information from the information processing apparatus of the information notification source.

A computer-implemented method is provided that executes an operation including periodically capturing information from a first apparatus using a camera, translating the captured information to determine occurrence of an error and providing a notification to a second apparatus.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although a few embodiments have been shown and described, it would be appreciated by those skilled in the art that changes may be made in these embodiments without departing from the principles and spirit of the invention, the scope of which is defined in the claims and their equivalents.

What is claimed is:

1. An information notification method, comprising:
generating coding information by a first information processing apparatus based on information including detected failure information;
displaying the coded information on a screen of the first information processing apparatus;
capturing displayed coded information, as image information, by a second information processing apparatus having an image-capturing unit;
transmitting the obtained image information to a third information processing apparatus from the second information processing apparatus;
receiving, at the third information processing apparatus, the image information transmitted from the second information processing apparatus; and
decoding, by the third information processing apparatus, the received image information so as to obtain the coded information.

2. The information notification method according to claim 1, wherein
the first information processing apparatus updates the displayed information at a predetermined time period, and
the second information processing apparatus periodically obtains the image information displayed on the first information processing apparatus at a time interval synchronized with a time interval at which the displayed information is updated.

3. The information notification method according to claim 1, wherein
the second information processing apparatus obtains, as image information, the information displayed on the screen of the first information processing apparatus and determines whether the obtained information is predetermined information, and
the second information processing apparatus does not transmit the obtained image information to the third information processing apparatus when the obtained information is the predetermined information, and transmits the obtained image information to the third information processing apparatus when the obtained information is not the predetermined information.

4. The information notification method according to claim 1, wherein
the second information processing apparatus generates an electronic mail that contains the obtained image information, and transmits the generated electronic mail to the third information processing apparatus.

5. The information notification method according to claim 1,
wherein the first information processing apparatus converts information into a QR code, and displays the converted QR code on the screen,
the second information processing apparatus obtains, as image information, the QR code displayed on the screen of the first information processing apparatus, and transmits the obtained QR code to the third information processing apparatus, and
the third information processing apparatus receives the QR code transmitted from the second information processing apparatus, and decodes the QR code so as to obtain the information before being converted into the QR code.

6. An information notification system, comprising:
a first information processing apparatus including a coding unit configured to generate code information based on information including detected failure information, and a display unit configured to display the coded information;
a second information processing apparatus including an image-capturing unit that captures image information displayed on the display unit of the first information processing apparatus, and a transmission unit configured to transmit the image information obtained by the image-capturing unit to a third information processing apparatus; and the third information processing apparatus including a receiving unit configured to receive the image information transmitted from the second information processing apparatus, and a decoding unit configured to decode the image information received by the receiving unit.

7. The information notification system according to claim 6, wherein
the first information processing apparatus periodically updates the information displayed on the display unit, and
the image-capturing unit of the second information processing apparatus periodically obtains, as image information, the information displayed on the screen of the first information processing apparatus in synchronization with a timing at which the displayed information is updated.

8. The information notification system according to claim 6,
wherein the second information processing apparatus includes a determination unit configured to determine whether the information obtained by the image-capturing unit is predetermined information, and
wherein the second information processing apparatus does not transmit the image information of the obtained information to the third information processing apparatus when the determination of the determination unit indicates that the obtained information is the predetermined information, and transmits the obtained image information to the third information processing apparatus when the obtained information is not the predetermined information.

9. The information notification system according to claim 6, wherein the second information processing apparatus is a cellular phone, and transmits the image information to the third information processing apparatus by using an electronic mail transmission function possessed by the cellular phone.

10. An information processing apparatus, comprising:
the information processing apparatus configured to communicate with a computer to execute an operation including:
capturing, as image information, information displayed on a screen of an information processing apparatus of an information notification source, said information displayed being based on detected failure information;
selectively transmitting the image information captured; and
controlling the image information to provide notification pertaining to the information processing apparatus.

11. The information processing apparatus according to claim 10, wherein the information processing apparatus is a cellular phone, and transmits the captured image information by using an electronic mail transmission function possessed by the cellular phone.

12. A tangible computer-readable recording medium having stored thereon an information notification program for causing a computer to execute an operation including controlling an information processing apparatus, comprising:
capturing, as image information, information displayed on a screen of an information processing apparatus of an information notification source at a predetermined timing, the information displayed being code information generated responsive to a detected failure; and transmitting the image information captured to an information processing apparatus of an information notification destination.

* * * * *